(12) United States Patent
Hasan Mahmoud et al.

(10) Patent No.: US 7,193,992 B2
(45) Date of Patent: Mar. 20, 2007

(54) METHOD OF RADIO RESOURCE MANAGEMENT FOR INTEGRATED VOICE AND DATA CDMA NETWORKS

(75) Inventors: Ashraf S. Hasan Mahmoud, Nepean (CA); Robin M. Hudson, Carlton Place (CA); Uthman Baroudi, Nepean (CA); Ian R. Gillespie, Ottawa (CA)

(73) Assignee: Nortel Networks Limited, Montreal (CA)

( * ) Notice: Subject to any disclaimer, the term of this patent is extended or adjusted under 35 U.S.C. 154(b) by 886 days.

(21) Appl. No.: 10/014,497

(22) Filed: Dec. 14, 2001

(65) Prior Publication Data

US 2003/0112762 A1    Jun. 19, 2003

(51) Int. Cl.
*H04L 12/66* (2006.01)
*H04L 27/00* (2006.01)
*G08C 25/02* (2006.01)

(52) U.S. Cl. ...................................... 370/356
(58) Field of Classification Search ................ 370/252, 370/445, 338, 477, 331, 238, 468, 329, 337, 370/352, 321, 349, 335, 328, 232, 356, 466; 455/436, 450, 423, 522, 69, 13.3, 434, 426, 455/67.11, 63.1, 67.13, 452, 405, 62, 453; 705/8; 375/259; 714/748, 708; 709/232
See application file for complete search history.

(56) References Cited

U.S. PATENT DOCUMENTS

| | | | | |
|---|---|---|---|---|
| 4,939,731 A | * | 7/1990 | Reed et al. | 714/748 |
| 6,069,883 A | * | 5/2000 | Ejzak et al. | 370/335 |
| 6,484,145 B1 | * | 11/2002 | Horne et al. | 705/8 |
| 6,490,249 B1 | * | 12/2002 | Aboul-Magd et al. | 370/232 |
| 6,539,003 B1 | * | 3/2003 | Agarwal et al. | 370/324 |
| 6,765,969 B1 | * | 7/2004 | Vook et al. | 375/259 |

(Continued)

OTHER PUBLICATIONS

Kojima, F .; Sampei, S.; Morinaga, N.; An intelligent radio resource management scheme for multi-layered cellular system with different assigned bandwidths under non-uniform traffic conditions; Universal Personal Communications, 1998. ICUPC '98. IEEE 1998 International Conference on vol. 1, Oct. 5-9, 1998 pp. 157-161 vol. 1.*

(Continued)

*Primary Examiner*—Chi Pham
*Assistant Examiner*—Prenell Jones (57) ABSTRACT

Method and system for managing radio resources to support voice and data traffic. The method uses adaptive resource partitioning between voice and data as the basis for improving call access control. A cost function is used to determine partitioning based on an operator's desired call blocking rates for both incoming voice and data traffic. Other examples of the cost function can be constructed using other quality of service measures for the carried services. In the dynamic burst allocation area, three methods are provided that make use of adaptive burst allocation, scheduled bursts and power borrowing between users as enhancements to the conventional methods used for integrated wide-band CDMA networks. The methods disclosed may be used in isolation as an enhancement to the current CDMA networks, or in combination to provide a combined improvement in network performance. The first scheme for adaptive burst allocation equalizes the rate of information transmitted by different data users. The second scheme varies adaptively the burst rate pool size as network interference varies. The third scheme links between the quality of service requirements and burst rate.

12 Claims, 6 Drawing Sheets

U.S. PATENT DOCUMENTS

| | | | |
|---|---|---|---|
| 6,975,609 B1* | 12/2005 | Khaleghi et al. | 370/335 |
| 2002/0012332 A1* | 1/2002 | Tiedemann et al. | 370/335 |
| 2003/0058797 A1* | 3/2003 | Izmailov et al. | 370/238 |
| 2003/0078010 A1* | 4/2003 | Davis | 455/69 |
| 2005/0026642 A1* | 2/2005 | Lee et al. | 455/522 |
| 2005/0193140 A1* | 9/2005 | Tiedermann et al. | 709/232 |
| 2006/0002338 A1* | 1/2006 | Guo | 370/328 |

OTHER PUBLICATIONS

Noubir, G.; Inter-layer radio resource management for hierarchical cell structures in the frames project Global Telecommunications Conference, 1998. GLOBECOM 98. The Bridge to Global Integration. IEEE.*

* cited by examiner

METHOD OF RADIO RESOURCE MANAGEMENT FOR INTEGRATED VOICE AND DATA CDMA NETWORKS

FIELD OF THE INVENTION

The present invention relates to a method of radio resource management for integrated voice and data code division multiple access (CDMA) networks.

BACKGROUND OF THE INVENTION

Radio resource management (RRM) is one of the most critical functions in a wireless network. It determines the overall utilization and efficiency of the radio network as well as the quality of service (QoS) experienced by the mobile users. Two main functions of RRM are the call admission control (CAC) and the dynamic bandwidth allocation (DBA) procedures.

CDMA systems are interference limited and their capacity is largely determined by the carried traffic characteristics and the radio resources management mechanisms employed. This is even more critical for integrated networks where both voice and data traffic are serviced. The overall traffic mixture have a wider degree in variability, compared to voice networks, and thus the interference environment is more dynamic. The goal of a successful RRM policy is to optimize the system capacity without adversely affecting the quality of service for voice or data calls.

Data traffic, especially for Internet applications, is typically characterized as being bursty that is there are bursts of traffic with idle time therebetween. During bursts, the network, ideally, should allocate the required resources to transmit the information at the granted bit rate. However, since the interference level varies as the carried load in the overall network varies, it is not possible to allocate the required resources all of the time. Current systems employ static resource allocation schemes that do not provide optimal capacity or throughput for mobile users. These schemes are not able to respond to the variation in the traffic demand and interference level.

Initial deployments of CDMA integrated networks include legacy RRM routines that are usually static in nature and do not account for the network dynamics, in terms of interference level and bandwidth requirement. Static RRM routines and functions lead to poor utilization of the radio spectrum and do not maximize the network throughput.

The call admission control procedure is especially critical for integrated networks. A conventional method used in the art is to divide the resources such as RF power and codes between voice and data calls in a way that achieves an acceptable performance for both services under general operating conditions. Using this simple method, the designer would specify the fraction of resources that can be used for voice traffic. Assuming the network serves only voice and data, this automatically specifies the fraction of resources that can be used for data.

One way to circumvent effects of traffic variation is to employ a more intelligent partitioning scheme. A known method used in the art is to allow the resources to be shared among different types of traffic with/without assured guaranteed share of resources to any type of traffic. It is obvious that such scheme provides a level of dynamic sharing of resources; yet, the network has no preference to either type of traffic and the amount of resources occupied by one type of traffic compared to that occupied by the other is totally dependent on the arrival process of the traffic. Hence, if at some period of the day, data calls arrive at a much higher rate compared to arrivals of voice calls, it is possible that network resources will be totally supporting data calls with none allocated or reserved for voice. This may not be desirable by the operator, especially if voice service is considered to be the primary service. Of course, the opposite scenario where voice calls occupying all the network resources and depriving data users based on the traffic condition (the ratio of voice calls arrival rate to data calls arrival rate) at one particular period of the day may also be not desirable for an operator that would likes to balance data and voice usages.

The operator may design these partitions, referred to herein as maximum fractions of resource usage, for each type of traffic for a particular mix and intensity of call arrivals, but these partitions will cease to be appropriate when the traffic mix and intensity change either from one time of the day to another or from one day to the next.

When a total sharing solution is implemented, i.e. no partitioning or any type of traffic is allowed to use 100% of the resource, the network has no preference to either type of traffic. The amount of resources occupied by one type of traffic compared to that occupied by the other is totally dependent on the arrival process of the traffic. Although, the total sharing case, may appear to allow the maximum allocation flexibility it does not guarantee a specific grade of service for the carried traffic and hence may not be favored by the operator. The arrival process of traffic, which is beyond the control of the operator, dictates the provisioning of resources in the network and the grade of service experienced by the end user.

The flexibility of the wireless CDMA platform makes it very suitable for integrated services networks. It allows users of diverse traffic to be integrated. However, the burstiness of data traffic and the heterogeneous nature of data users make the assignment of data transmission rates and the granted burst duration very critical. An important question that needs to be answered is how to share the scarce network resources amongst users such that network performance is optimal?

The current art serves a data burst on a best effort basis. Typically, a data burst request is initiated whenever there is a need regardless of the requirements of other competing users. If resources are not sufficient to support the request even after downgrading its original requirements, the request shall be deferred randomly to have another chance later. This kind of best effort service does not provide any quality of service guarantee nor optimizes resources utilization.

As mentioned before, the determination of data burst rate and burst length in wide-band CDMA networks greatly influences their overall performance since data bursts are usually associated with high power and high bit rate transmissions. These have considerable effects on other ongoing activities in a CDMA environment.

Consequently, there is a need for new radio resource management schemes to accommodate the different requirements of data traffic when compared to voice. This would allow the efficient deployment of data services over what used to be mainly voice-oriented infrastructure.

SUMMARY OF THE INVENTION

An object of the present invention is to provide an improved method of radio resource management for integrated voice and data code division multiple access (CDMA) networks.

Accordingly, the present invention provides adaptive procedures to manage radio resources to support voice and data traffic.

Conveniently, the embodiments of the present invention described herein can be used in isolation of each other as an enhancement to the current CDMA networks, or a combination of them can be implemented to provide a combined improvement in network performance.

Conveniently, in the CAC area, a method is provided that can be incorporated to improve conventional call admission procedures. The method is referred to herein as adaptive resource partitioning.

Conveniently, in the DBA area, three methods are provided that make use of adaptive burst allocation, scheduled bursts and power borrowing between users as enhancements to the conventional methods used for integrated wide-band CDMA networks. Resources referred to herein include, but not limited to, forward link power and Walsh codes.

BRIEF DESCRIPTION OF THE DRAWINGS

The present invention will be further understood from the following detailed description with reference to the drawings in which.

DETAILED DESCRIPTION OF THE PREFERRED EMBODIMENT

In this section we present an advanced scheme for improving on resource sharing as provided by the dynamic resource sharing method. This new scheme is directly applicable but not limited to cdma2000 networks. This scheme builds on the dynamic sharing method described in the previous section and attempt alleviate its shortcomings by including the following two mechanisms:

The network can adapt its resource partitioning to accommodate varying traffic conditions, and The resource partitioning should take into consideration the operator's service prioritization.

As was noticed from the background material, an optimal resource partition is only optimal for the specific traffic conditions used to arrive at this partition. When traffic varies throughout the day or from one day to the next, the network performance may become unacceptable even with the existence of unused portions of resources. In other words, underutilization of resources may take place while there exist above average traffic load simply because of restricting the maximum useable fraction of resources by less than a 100%. Setting the maximum fraction of useable resources to a 100%, the total sharing case, entails not guaranteeing bandwidth for services and allowing the arrival process of traffic to control the performance of the network.

Herein, we present a mechanism that alleviates the above shortcomings by adapting the maximum fraction of useable resources to traffic variations. We also incorporate into this mechanism a technique to reflect the operators' target performance for the network.

The operator's objective according to this scheme should be weighed by normalized units of impact for the services of interest (e.g., voice and data). In addition, the objective target performance figure itself can be the desired blocking rates for the carried services or the desired call dropping rate. Other quality of service measures such as frame error rates, data packet delay, etc. may also be used to express the objective target performance for the network. The following subsection details the mathematical expression of the operator's target network performance or the cost function.

The performance of the network can be enhanced, as explained earlier, by allowing the resources partitioning to vary in response to variations in the offered traffic pattern. This variation can be controlled through a cost function. The cost function is a mathematical abstraction of the operator's desired network performance. The adaptive resources partitioning scheme should operate always to minimize this cost function; i.e. to optimize the performance of the network.

One proposed cost function herein is based on the operator's desired call blocking rates for both incoming voice and data traffic. Other examples of the cost function can be constructed using other quality of service measures for the carried services as mentioned earlier. Using the blocking rates for voice and data is directly applicable to operators' revenue models and operation since revenue is proportional to amount of carried calls (or inversely proportional to blocking rates). Furthermore, one can also reflect relative emphasis of one traffic type over the other. The cost function can be written as $$\text{Cost} = W_v \times [f_v(T_v, T_d) - P_{Bv}^*]^P + W_d \times [f_d(T_v, T_d) - P_{Bd}^*]^P$$

where:
$T_v$ and $T_d$ are maximum fractions of resource partitioning values for voice and data, respectively $W_v$ and $W_d$ are positive constants representing the relative weighing of voice vs. data $f_v(T_v, T_d)$ and $f_d(T_v, T_d)$ are the current estimated blocking rates for voice and data traffic, respectively $P_{Bv}^*$ and $P_{Bd}^*$ are the target blocking rate for voice and data respectively P is a positive number The function [x] is equal to x for positive x and is equal to 0 for nonpositive x It should be noted that the cost function should possess the following characteristics:

The expression has two error terms: one pertaining to voice traffic performance and another pertaining to data traffic performance. The weights $W_v$ and $W_d$ control the contribution of these error terms to the overall cost function. Hence, $\text{Cost} = W_v \times [(f_v(T_v, T_d) - P_{Bv}^*)]^P$ is one example of the many forms of the cost function where $W_d$ is set to zero.

The target blocking figures can be set for overall network or for every sector/BTS. This decision has to match the level of the deployment of this adaptive algorithm. This point is further detailed in the design alternatives subsection.

One scheme for choosing the appropriate values for $W_v$ and $W_d$ can be based on the revenue model. For example, if, revenue wise, a voice call is 3 times as important as a data call, then one can set $W_v$ to 3 while $W_d$ is set to 1. This will put more emphasis on meeting the voice target blocking rate compared to that for data, since it contributes three times as much to the overall cost.

One can note that the cost function is minimized when the blocking rates PBv* and PBd* are met. Furthermore, if the target blocking rates PBv* and PBd* are set to zero in the original cost function, then the objective translates to minimizing the blocking rates for both voice and data (with the appropriate emphasis reflected through Wv and Wd) as opposed to meeting specific target blocking figures.

Finally, the material presented considered only two types of services, namely, voice and data, and focused on optimizing the resource partition between these services. The cost function formulated above reflects these components and the corresponding network performance as experienced by these two distinct services. The methodology presented in this invention applies to any number of services. The concept of the cost function can be extended to include any number of traffic types by including additional error terms. Error terms, one for each service, are summed to represent the overall cost. Then the adaptive algorithm utilizing this multi-term cost function should find out the optimal resource partition amongst these types of traffic.

Figure 1:
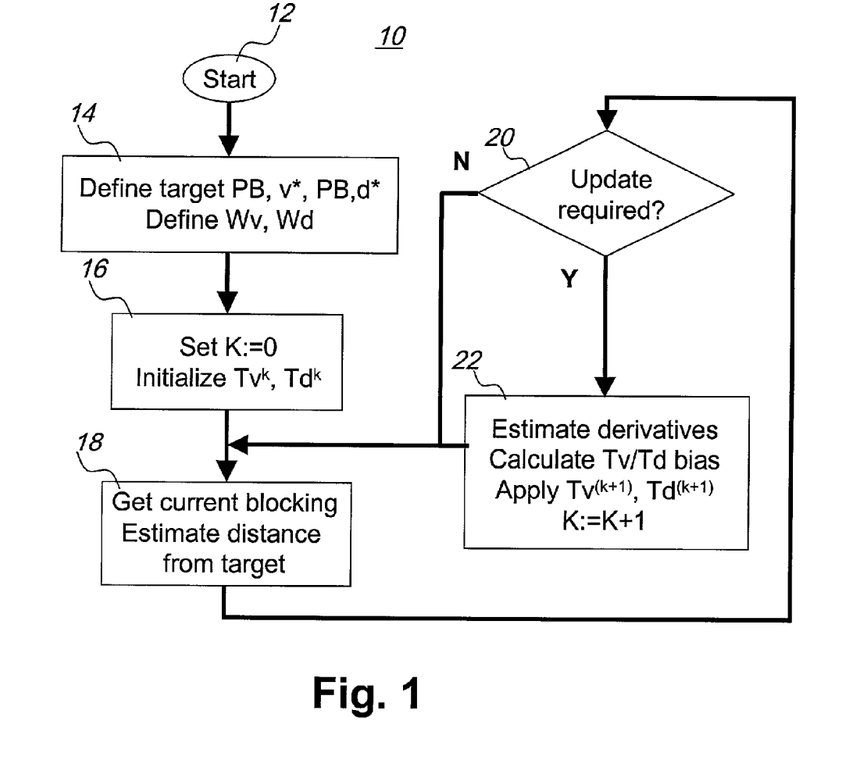
FIG. 1 illustrates in a flow chart adaptive resource partitioning in accordance with an embodiment of the present invention.

Referring to FIG. 1 there is illustrated in a flow chart an adaptive resource partitioning method in accordance with an embodiment of the present invention. The adaptive resource partition method 10 begins at a start block 12. A process block 14 defines the target blocking rates for voice and data and the weighting factors for voice and data. A process block 16 sets k=0 and initializes traffic levels for voice and data. Then the adaptation algorithm uses the cost function to evaluate the appropriateness of the current resources partitioning. Every iteration, the algorithm evaluates the cost function for the resources partitioning set in the previous iteration using the corresponding blocking rates estimates 18. Comparing 20 the new value of the cost function to that corresponding to the previous partitioning provides the direction information needed to guide the adaptation process. Specifically, the variation observed in the cost function value determines the amount of bias required to compute 22 the new resources partitions. FIG. 1 illustrates the main steps of the adaptation algorithm. The process described above does not necessarily require the network to maintain previous blocking rate estimates since the algorithm needs only the value of the cost function from the previous iteration.

Figure 2:
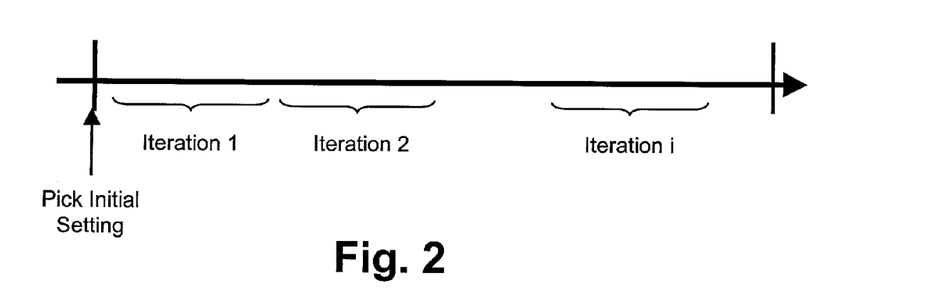
FIG. 2 illustrates in a flow chart a scheduled burst method in accordance with an embodiment of the present invention.

Initially, the network picks an initial setting for the resources partitioning or uses a setting that is deemed appropriate for this particular time of the day as represented by process block 14. Historical logs can contain resources settings for every time of the day period of distinct traffic behaviours. The adaptation algorithm uses this initial setting and the most recent blocking rates to compute the new resources partition for the next iteration. These new partitions are then communicated to the network as represented by process block 16. For subsequent iterations, the algorithm uses the last computed setting as its initial value. The algorithm executes continuously to ensure that the partitioning is best optimized for handling the current traffic pattern. The processing of blocking rates estimates as represented by process block 18 and calculations of the new partitions as represented by process block 22 take place at the beginning of every iteration segment. The span of each segment should be long enough for the blocking rate estimator process to collect reliable estimates but also short such that the algorithm can track expected changes in the traffic behaviour. FIG. 2 depicts the operation of the adaptive algorithm.

The iterative computation of the new resource partitioning should always (or on average, depending on the approach being either deterministic or statistical) be geared towards producing a lower value for the cost function as iterations progress. To this end, the adaptation algorithm should utilize the changes in the magnitude of the cost function and the sign (positive or negative) of this change. Essentially, the algorithm shall search for (or iteratively compute) the (Tv, Td) pair that minimizes the cost function. This can be accomplished using many different and well-known techniques studied in the art of Calculus. These techniques range from simple comparisons between the current and past values of the cost function to deduce the direction and may be the magnitude of the change in the resource partitioning, to formal techniques that utilize derivatives of the cost function. The differentiation process captures the magnitude of the variation in the function and its sign; the two ingredients required to guide this search procedure. One example of a search technique that can be used iteratively to arrive at the pair (Tv, Td) that optimizes the resource partitioning is the steepest descent scheme.

Referring to FIG. 2, there is graphically illustrated a timeline for the adaptation process of FIG. 1. Tv/Td is updated in every iteration window, which lasts about 30 or 60 minutes to estimate blocking rates. Each iteration includes the following:

Collect most recent blocking rate of previous iteration;
Evaluate cost function;
Find direction and amount of bias for new partition setting;
Compute next partition;
Update network parameters The following functionalities are needed to work interactively to implement adaptation process as illustrated in FIG. 2:

1. Tv/Td adaptation function to update partition through cost function evaluation and derivative calculation;
2. Performance estimator to measure the blocking rates; RRM to implement new resource partition;
3. Database function to store historical logs for blocking rates and Tv/Td settings of previous windows;
4. A local RRM database to keep system parameters such as target blocking rates and weights.

In this subsection we describe one possible implementation method for the adaptive resource partitioning scheme. In this implementation the algorithm operates continuously adapting to the current traffic conditions with no interruptions of its executions or re-initialization of the algorithm variables. Hence, throughout the time of the day, the algorithm must keep track of real-time estimates of the parameters used to evaluate the cost function (the blocking rates in the example given in this document) and use the changes in the cost function, in the manner described above, to compute the next resource partition. This operation continues with all iterations being identical, with the exception of the very first iteration during which an initial (as opposed to a computed value) is used to drive the network.

While this procedure is the most intimate with the network operation since it relies of real-time estimates of its performance and applies the calculated resource partitions in real-time to the network, it may not perform optimally in situations of extreme variations in traffic conditions. The response of adaptation algorithm, i.e. its convergence time to a solution due to traffic variations, may require an excessive number of iterations under the later conditions. This response time is controlled by the accuracy of the real-time performance figures estimates used to drive the algorithm and the particulars of the search engine used to arrive at the optimal resource partition. This can be improved using known techniques in the art, however, the real-time operation will still incur some errors in the estimation process and thus may lead to extended response times under conditions of extreme variations.

To do away with the network performance real-time estimation and in an attempt to allow the resource partitioning algorithm to utilize historical information, one may use the following implementation. Using this method, the day is divided into periods of distinct traffic patterns or conditions. At the onset of each period, the algorithm utilizes performance figures of the same period but belonging to past days. The previous resource partitioning values of the same period of the past operation day is used in conjunction with the report performance figures to calculate the new partition. This new partition is then applied to the network. No further calculations are required for the rest of the period. A pictorial depiction of this method is shown in FIGS. 3a and 3b.

Figure 3A:
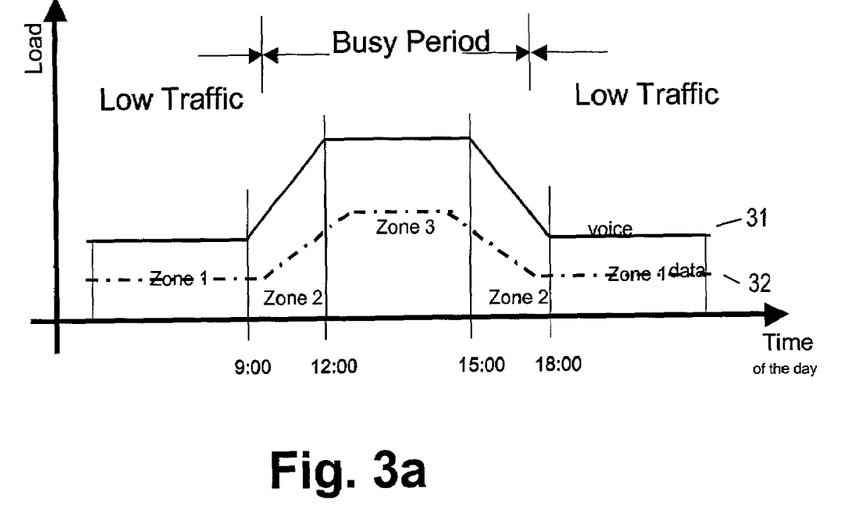
FIGS. 3a and 3b illustrate load and traffic to which a reduced iteration adaptive resource partitioning method in accordance with an embodiment of the present invention is applied.
Figure 3B:
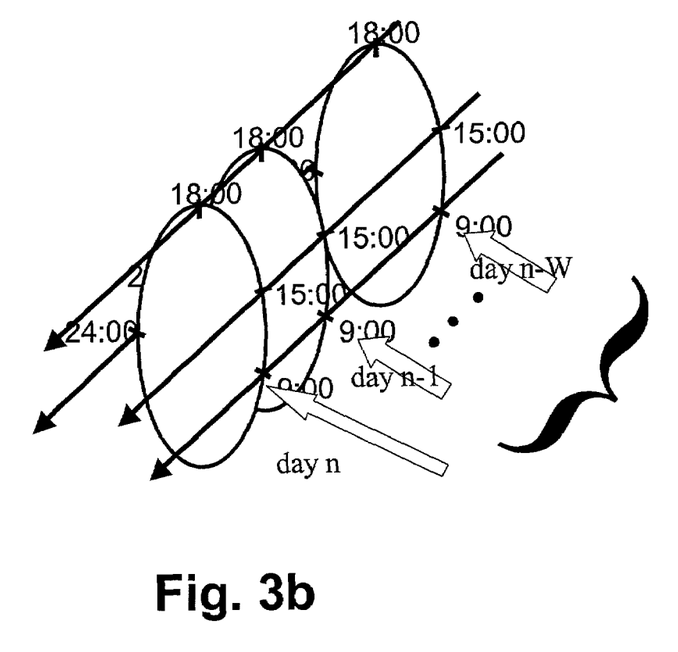

FIGS. 3a and 3b illustrate load and traffic to which a reduced adaptive resource partitioning method in accordance with an embodiment of the present invention is applied. In FIG. 3a, lines 31 and 32 represent load of voice and data. In FIG. 3b, each arrow represents traffic density of the specific time of the day.

Referring to FIG. 3a, the day is divided into three kinds of zones (zone 1, zone 2 and zone 3). Zone 1 shows low traffic and zones 2 and 3 show that traffic is busy. Variation of load shown in FIG. 3a may be repeated. Thus, the algorithm utilizes performance figures of the same period but belonging to past days.

Ideally, the algorithm should distinguish between weekdays and weekends since traffic patterns belonging to the same time of the day for these parts of the week are different. Typically, for a given period higher traffic intensity is expected during the weekday compared to that for the weekend.

Referring to FIG. 3b, arrows represent traffic intensity of day n-w, n-1 and n, respectively. For example, day n-1 and day n-w (weekday) have same traffic patterns. Day n (weekend) has a different traffic pattern from that of day n-1

Since this method relies on past performance information, the estimates for the performance figure are more accurate compared to the real-time estimations. Hence, a lower number of iterations is required to arrive at the optimal resource partitioning for the network.

This method is a combination of the real-time implementation and the reduced iteration implementation. The scheme described for the reduced-iteration method depends solely on the performance figures of previous days for the same period. The algorithm executes once at the onset of the period and the network executes the new resource partitions for the remainder of the period with no regard to the interim traffic variations. This can be alleviated by allowing the algorithm to continue receiving real-time estimates of the performance figure and adapting its resource partition continuously during the time of the day period. This allows the algorithm to respond to unexpected traffic demands that may not be reflected by the average traffic load as seen from the past history of this particular period of the day.

DBA procedures proposed herein attempt to control interference within the service area by controlling the activities of the ongoing calls. Specifically, some of these controlling mechanisms like halting, dropping, or queueing are applicable to certain types of calls more than others. For example, an ongoing data packet session can be halted momentarily but a voice call cannot be dropped unless it is absolutely necessary from the point of view of radio resource management. Data burst rate and length determination in wide-band CDMA networks greatly influences their overall performance since data bursts are usually associated with high power and high bit rate transmissions. These have considerable effects on other ongoing activities in a CDMA environment.

This embodiment of the present invention enhances the CDMA integrated wireless network performance by making the determination of the data burst rate and/or burst length adaptive. Furthermore, it presents a scheduling algorithm that allows the network to make intelligent decisions in regard to these key elements. Adapting burst rate and/or burst duration can be included to limit interference especially at high traffic loads. In this document we present three methods of adaptively determining the burst rate and burst duration.

These methods are directly applicable to current cdma2000 networks where users contend for access to transmission channels. These methods are applicable where a central scheduling mechanism is employed to provide access to transmission channels as explained herein below.

The first method for adaptive burst allocation tries to equalize the rate of information transmitted by different data users. The method works as follows. Let $T_{max}$ is the minimum burst duration when maximum burst rate $R_{max}$ is granted. To equalize the information rate on the channel, a user allocated a lower burst rate ($R<R_{max}$) is assigned a burst duration (T):

$$T = \frac{R_{max}}{R} T_{max}$$

The second method for adaptive burst allocation tries to adaptively vary the burst rate pool size as network interference varies. Hence, at burst request, the network measures amount of interference currently existing and picks a transmission rate that is appropriate for providing a compromise between adding significantly to the interference level and granting the highest rate possible. Typically, at low loads, the interference level is low and thus most burst requests will be granted high transmission rates. However, as load increases, interference levels increase, and the network should limit access to these high transmission rates. At moderate to high load, more of the moderate to low transmission rates are allocated. This method allows the network to carry more calls at the expense of higher delays for data traffic.

The third method for adaptive burst allocation tries to link between the quality of service (QoS) requirements (e.g. delays) and burst rate. Using this method, the network favours assigning lower rates all the time. At burst service, the network computes an ordered list of available transmission rates for the user in question. The network has also information regarding its delay requirements and its buffer status. Starting from the lowest rate in the list, the network calculates the amount of time required to transmit the user's buffer contents at that rate; if the calculated time exceeds the maximum burst duration allowed, the rate is rejected and the process is repeated with the next higher rate. The network progressively examines the rates until a solution is found or the list is exhausted. If the list is exhausted, the highest available rate is chosen.

In contrast to popular implementation of CDMA2000 standards, the scheduling procedure involves storing data burst requests and scheduling them to be served later. Data burst scheduling algorithm would serve a wide range of purposes (optimizing throughput, reducing delay etc) based on the applied scheduling discipline. The main objectives include, but not limited to, minimizing and/or eliminating idle time on the data channels, providing service class differentiation, as well as minimizing mutual interference. Data burst requests scheduling allows for more rigorous control of the interference level in the network. Hence, its throughput is expected to be greater than that obtained in contention-based CDMA2000 networks.

The basic idea of a proposed method is to maximize data burst transmission rate at minimum power interference cost. Therefore, data throughput is maximized. The proposed method is demonstrated in FIG. 4 and it works as follows. Power requirements for each stored data burst request is determined for different possible transmission rates. Then, these requests are sorted such that the one that can be served at maximum rate with minimum power requirement is given the highest priority and so on.

Figure 4:
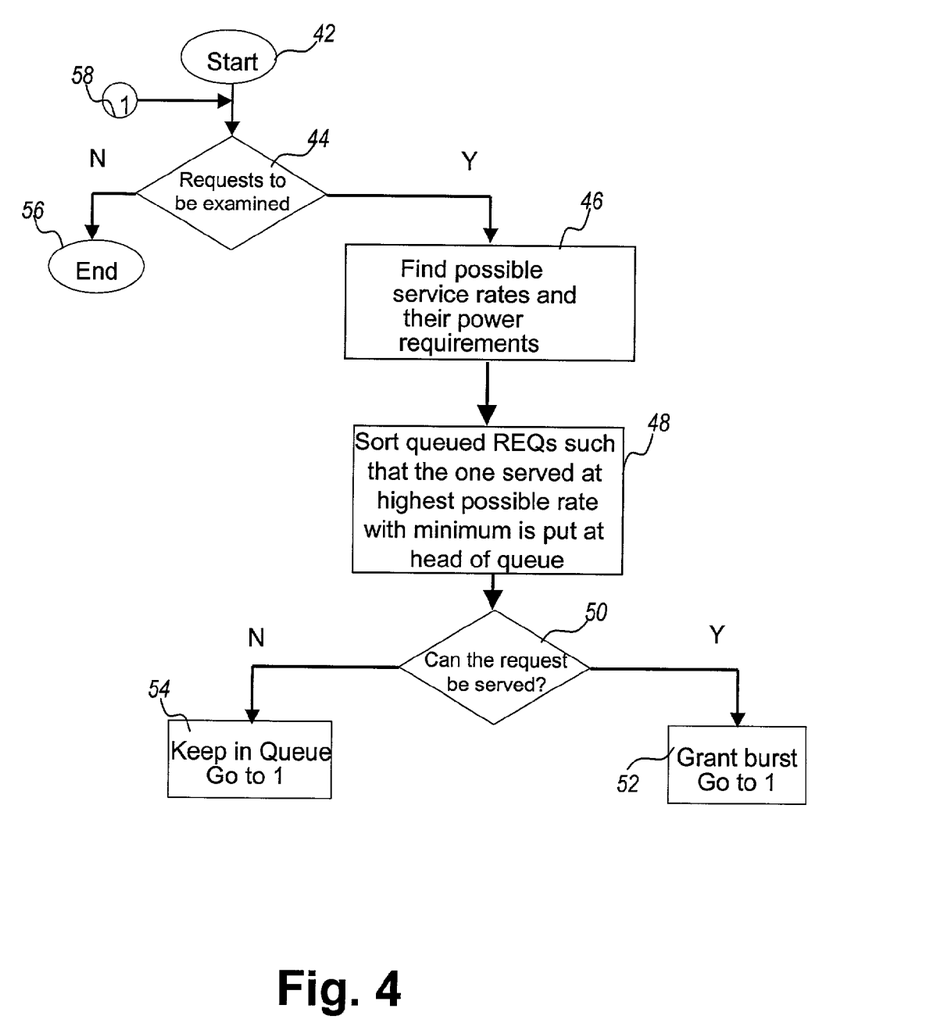
FIG. 4 illustrates a SCH burst scheduling method in accordance with an embodiment of the present invention.

FIG. 4 illustrates a data burst scheduling method in accordance with an embodiment of the present invention. The data burst scheduling method 40 begins at a start block 42 and has a loop back input 58 prior to a decision block 44. The decision block 44 determines if there are requests to be examined. If NO, the process ends at 56. If YES, a process block 46 finds possible service rates and their power requirements. Further, a process block 48 sorts queued REQs such that the one served at highest possible rate with minimum power requirement is put at head of queue. A decision block 50 determines if the request can be served. If No, the process is sent back to input 58. If YES, the burst is granted at 52 and then the process is sent back to input 58.

This method differs from the scheme implemented by High Data Rate (HDR) system in at least two fundamental ways. First, HDR does not store the data requests. Second, HDR looks for the highest transmission rate that yields minimum error under the given interference. It does not choose the rate such that mutual interference is minimized as the proposed scheme does.

During periods of high interference and/or very limited resources, data users with large amounts of data in their buffers may not be allocated a data burst channel for long periods of time and can be in danger of being dropped. As a last resort for preventing data session backlogs and session dropping a power-borrowing scheme has been devised. In operation, if there is insufficient power for data burst channel for a given user, under certain conditions the required power can be borrowed from other users in the system for short periods of time. Time limits are set on how often these "emergency bursts" can occur and on how long any given emergency burst can be maintained. This method allows data calls to be served with high-note bursts at the expense of a limited period of degradation in other users' quality.

Figure 5:
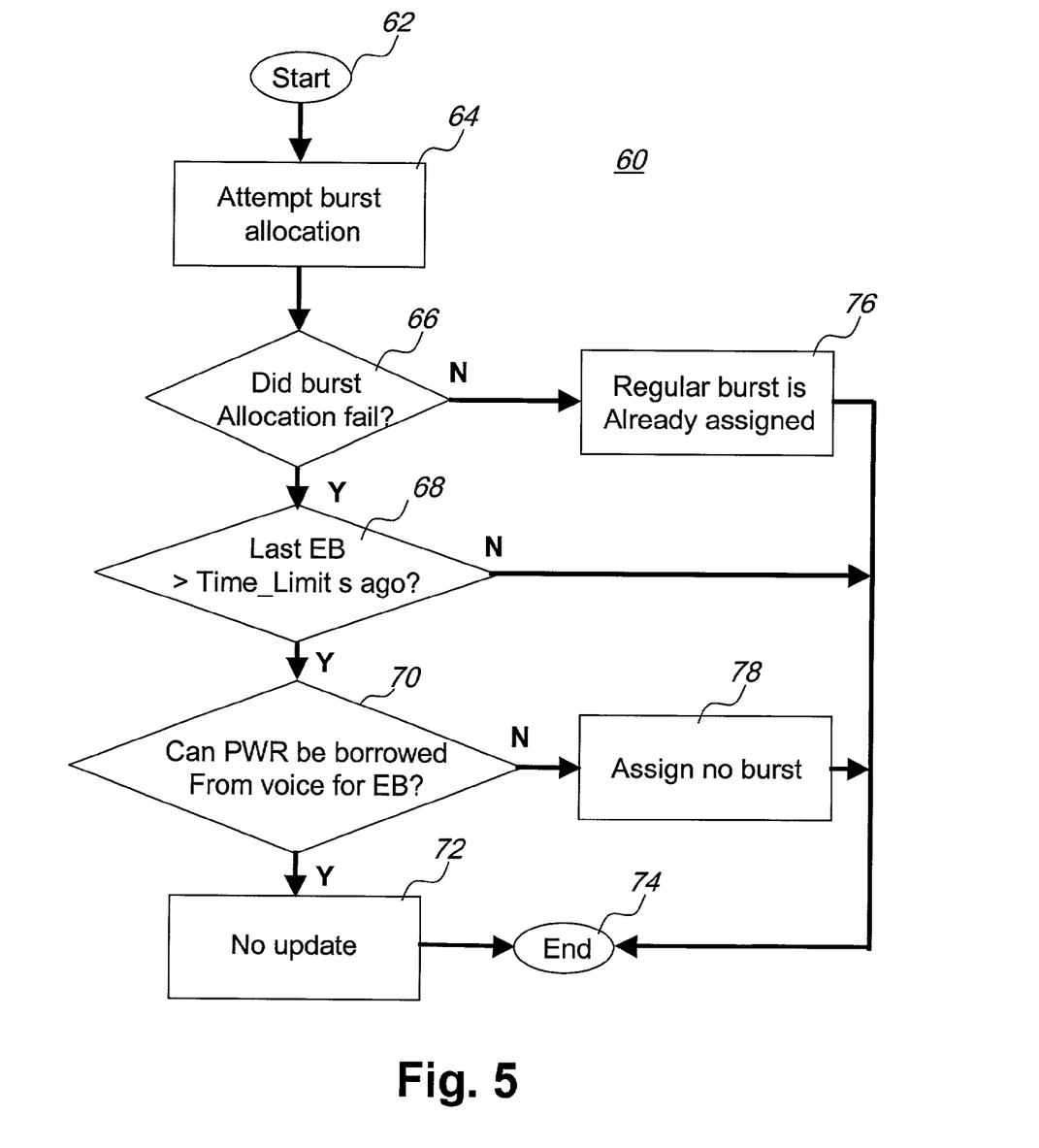
FIG. 5 illustrates the conditions under which a request to borrow power can occur when a regular burst negotiation fails.

Referring to FIG. 5, there is illustrated conditions under which a request to borrow power can occur. The power borrowing method 60 begins at start 62, the first step is attempting a burst allocation 64, followed by a decision block 66 querying if the burst allocation failed. If yes, a decision block 68 if last burst emergency burst was more than a predetermined time limit seconds before. If yes to decision block 68, a decision block 70 queries if power can be borrowed from voice for an emergency burst; if yes an emergency burst is assigned at 72, the end at 74. If no to the decision block 66 a regular burst is already assigned at 76 then to end 74. If no, to the decision block 68 the process goes to end 74. If no, to the decision block 70 the step assigns no burst at 70 then to end 74.

In operation, if there is insufficient power for a data burst, the required power may be borrowed form voice users. A time limit is set to limit how often these "emergency bursts", may occur. This method allows data calls to be served with high rate bursts, while there is excess power available from voice or perhaps even at the expense of a limited period of degradation in voice quality.

Two means of performing the emergency-burst negotiation are illustrated below. The first allows data users to borrow power from the voice population, while the second allows data users to momentarily borrow power from other data users who currently have access to burst channels. Whether or not data users are allowed to borrow from voice and/or data, will depend on the operator's requirements.

Figure 6:
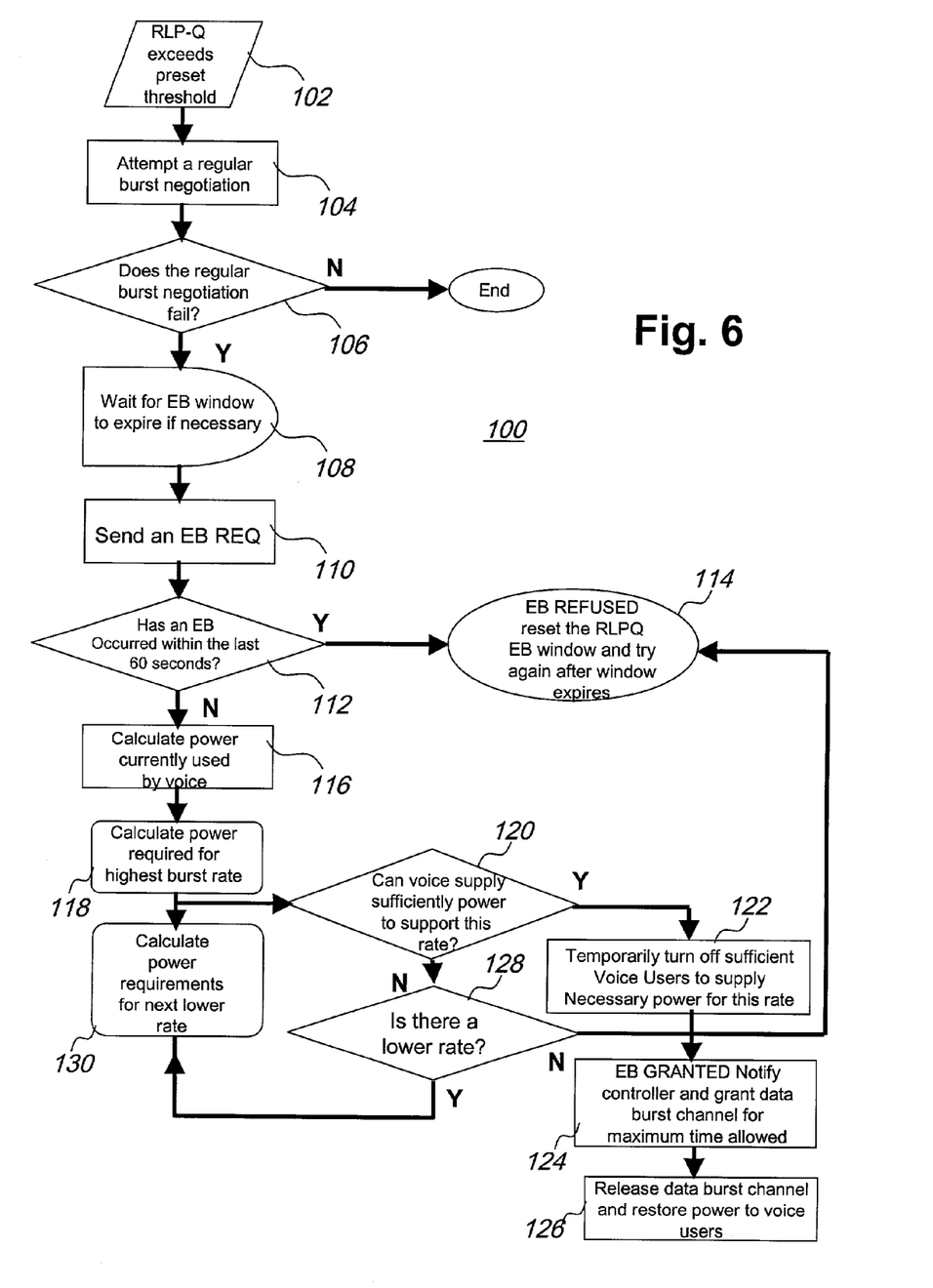
FIG. 6 illustrates the emergency burst negotiation process when power borrowing form voice users.

Referring to FIG. 6 there is illustrated an emergency burst negotiation method in accordance with an embodiment of the present invention. The emergency burst negotiation flow chart begins with a RLP-Q exceeding a preset threshold at 102. A response to which is to attempt a regular burst negotiation at 104. A decision block 106 determines if the regular burst negotiation fails. If yes a process step causes a wait for the emergency burst window to expire, then an EB request is sent at 110. A decision block 112 determines if an EB has occurred in the last 60 seconds. If yes, the EB is refused and the RLPQ EB window is reset; the process is tried again at 114. If no, a process block 116 calculates the power currently used by voice. A next process block 118 calculates the power required for a higher-rate burst. A decision block 120 determines if voice can supply sufficient power to support the highest rate. If yes, a temporary turn off of sufficient voice users to supply necessary power for this rate is provided at process block 122, followed by an emergency burst granted at 124 that notifies the controller and grants the data burst channel for the maximum time allowed followed at 126 by a release of the data burst channel and a restive power to the voice users. If no to decision block 120, a decision block 128 determines if there is a lower rate; if yes a process block 130 calculates power requirements for next lower rate. If no to the decision block 128, the EB is refused at block 114. The method of FIG. 6 is in the area of DBA as well. The method, referred herein as emergency burst is for borrowing power occasionally from ongoing calls causing momentarily degradation in their quality to improve some other critical performance figures. Here power borrowing operates in conjunction of resource partitioning as shown in FIG. 6.

Figure 7:
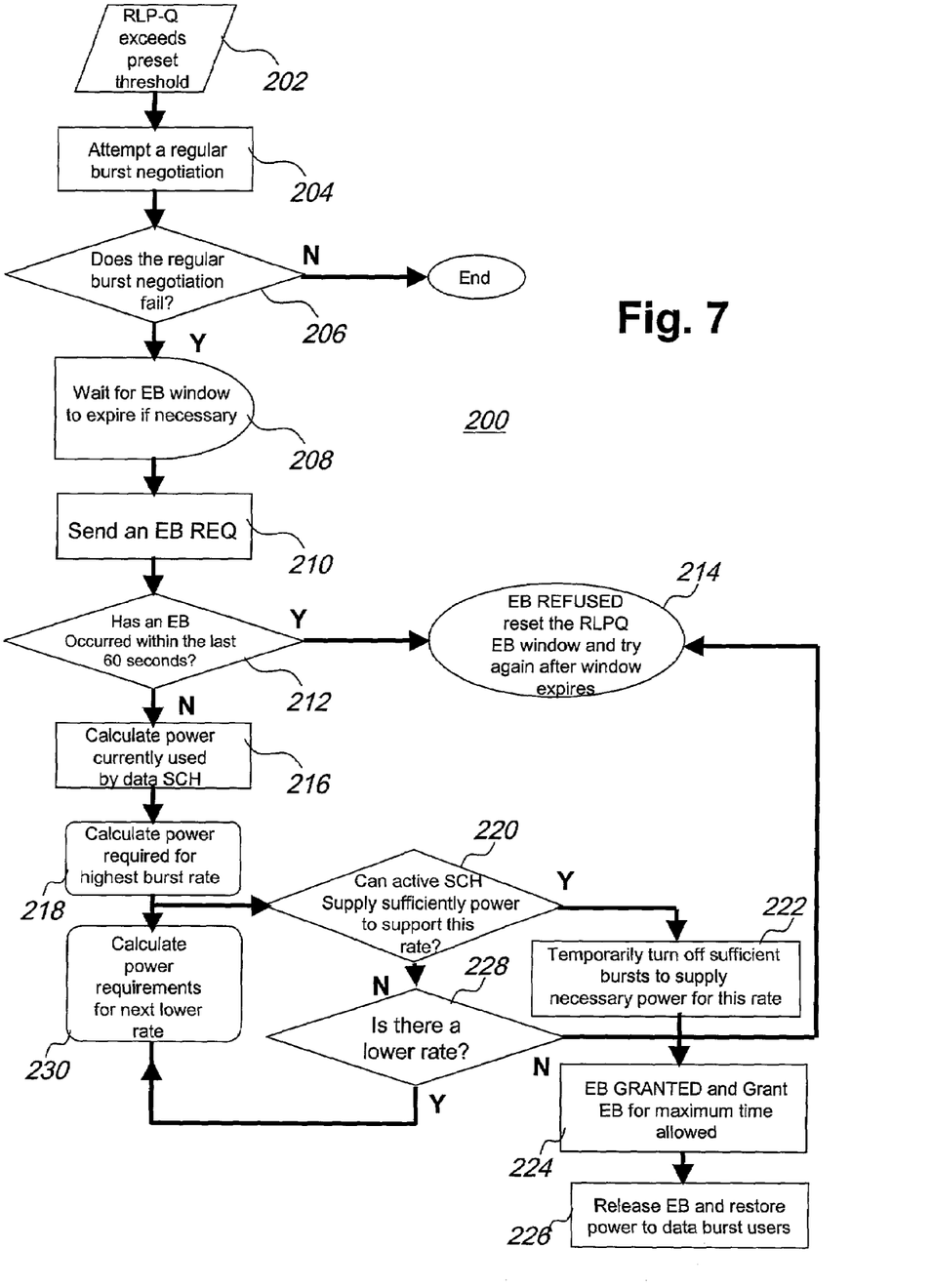
FIG. 7 illustrates the emergency burst negotiation process when power is borrowed from data burst users.

FIG. 7 illustrates an alternative method of emergency burst negotiation where power is borrowed from data users who are currently assigned data burst channels. The flow chart is identical to FIG. 6 up to and including decision block 212. IF an EB has not occurred within the last 60 seconds, a process block 216 calculates the power currently used by all active data burst channels. Again a process block 218 calculates the power required for a higher-rate burst. A decision block 220 determines if the active data burst channel can supply sufficient power to support the highest data burst channel rate. If yes, sufficient data burst channels are temporarily shut off to supply necessary power for this rate at process block 222, followed by an emergency burst granted at 224, that notifies the controller and grants the data burst for the maximum time allowed followed at 226 by a release of the data burst channel and the restoration of power to the data burst users. If decision block 220 determines no, the process is repeated for the next lower rate and so forth as in FIG. 6. If no to 228, the burst is refused at 214.

While the method of radio resource management has been described in terms of call blocking, the following variations are also possible:

the method applies to two or more partitions;

the method can use network performance figures other than call blocking such as delay for data traffic or call drop rate, etc, the cost function utilizes an error signal: the difference between the current performance figure and the target performance figure. Hence, we want to patent the use of any cost function involving such error signals.

What is claimed is:

1. A method of radio resource management comprising the steps of:

determining periodically a network cost for current network blocking rates for data and voice traffic based on predetermined target blocking rates, and adjusting a partition of voice and data traffic to minimize the network cost.

2. A method as claimed in claim 1 wherein the adjusting step adjusts the partition of voice and data traffic iteratively.

3. A method as claimed in claim 1 wherein the network cost is determined as:

$$Cost = W_v \times [f_v(T_v, T_d) - P_{Bv}^*]^P + W_d \times [f_d(T_v, T_d) - P_{Bd}^*]^P$$

where:

$T_v$ and $T_d$ are maximum fractions of resource partitioning values for voice and data, respectively;

$W_v$ and $W_d$ are positive constants representing the relative weighing of voice vs. data;

$f_v(T_v, T_d)$ and $f_d(T_v, T_d)$ are the current estimated blocking rates for voice and data traffic, respectively;

$P_{Bv}^*$ and $P_{Bd}^*$ are the target blocking rate for voice and data respectively;

P is a positive number; and the function [x] is equal to x for positive x and is equal to 0 for nonpositive x.

4. A method as claimed in claim 3 further comprising the step of updating the partition of voice and data based on the value of the network cost.

5. A method of radio resource arrangement comprising the steps of:

receiving a request for a data burst to be transmitted;

determining power requirement for the data burst at a plurality of possible transmission rates;

assigning a highest priority to the data burst requests serviceable at a maximum transmission rate with a minimum power requirement;

storing data burst requests in queues based on priority levels; and transmitting the data burst having a maximum transmission rate and a minimum power requirement;

wherein the data burst is chosen based on a comparative decision amongst currently contending data burst users.

6. A method of radio resource management comprising the steps of:

assigning a maximum burst rate and a corresponding minimum burst duration to a user in a wireless network with a plurality of data users;

equalizing a rate of transmitted information by adaptively allocating the user a second burst duration with a corresponding second burst rate, the second burst rate being lower than the maximum burst rate, so that the product of the second burst rate and the second burst duration is equal to the product of the maximum burst rate and the corresponding minimum burst.

7. A method of radio resource management comprising the steps of:

measuring an existing interference for an active user in a wireless network with a plurality of users having a pool of burst rates; and granting a highest possible burst rate for transmission from the pool of burst rates without adding significantly to the interference level.

8. A method as claimed in claim 7 wherein the interference is measured and reported to a controller.

9. A method as claimed in claim 7 further comprising the step of excluding high burst rates in the pool from transmission, when the interference is high.

10. A method as claimed in claim 7 further comprising the step of expanding the pool of burst rate size to include high burst rates for transmission, when the interference is low.

11. A method of radio resource management comprising the steps of:

computing an ordered list of available transmission rates for an active user in a wireless network with a plurality of users;

receiving a request for a transmission of a data burst from the user;

obtaining a quality of service requirement for the transmission of the data burst;

acquiring a buffer status for the transmission of the data burst;

selecting a lowest rate from the ordered list;

calculating a required time for the transmission of the data burst using the lowest rate; and transmitting the data burst whereby the required time is below an allowed maximum burst duration.

12. A method as claimed in claim 11 further comprising the steps of:

selecting a next lowest rate from the ordered list; and calculating a next required time for the transmission of the data burst using the next lowest rate;

whereby the required time is above and the next required time is below the allowed maximum burst duration.

* * * * *